Nov. 6, 1951　　　A. P. KRUEGER　　　2,573,911
TAPE-DISPENSING DEVICE
Filed July 12, 1946　　　3 Sheets-Sheet 1
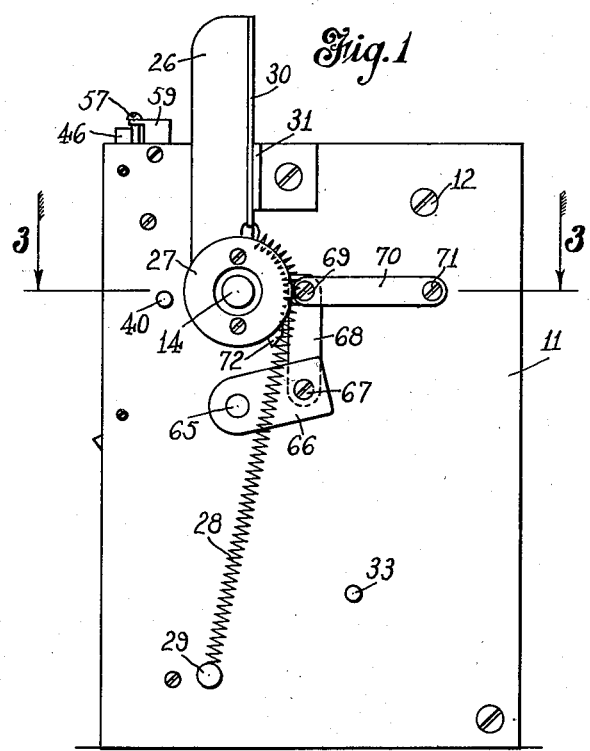
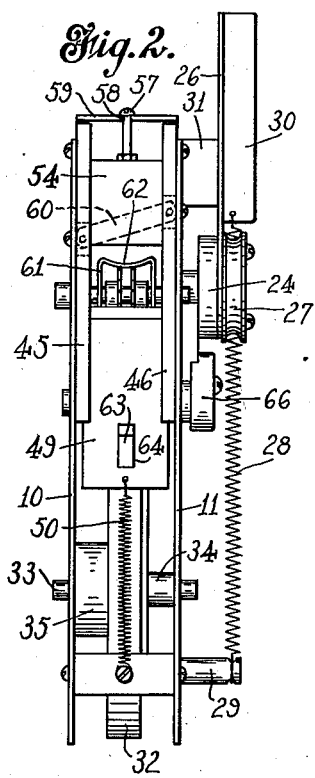
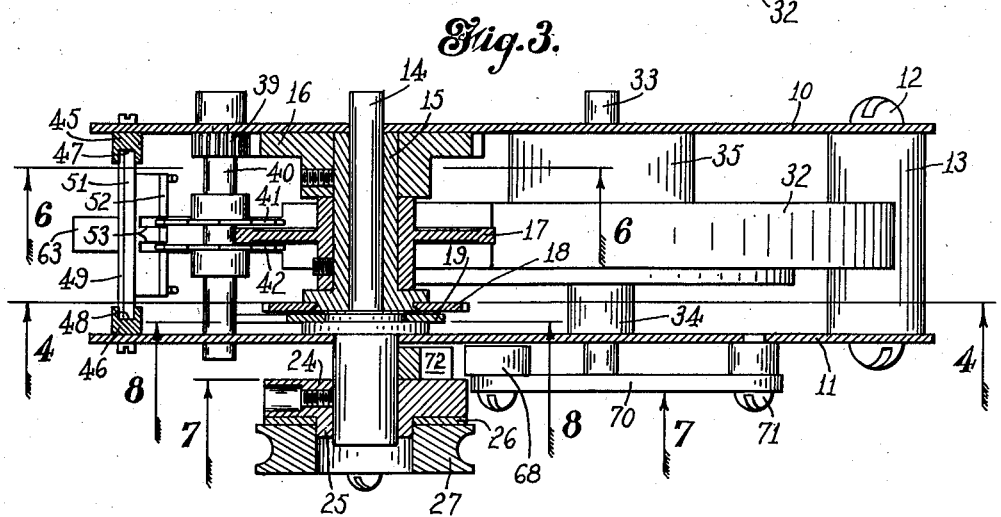
Inventor
Alfred P. Krueger
By Rockwell & Bartholow
Attorneys Nov. 6, 1951         A. P. KRUEGER         2,573,911
TAPE-DISPENSING DEVICE
Filed July 12, 1946         3 Sheets-Sheet 2
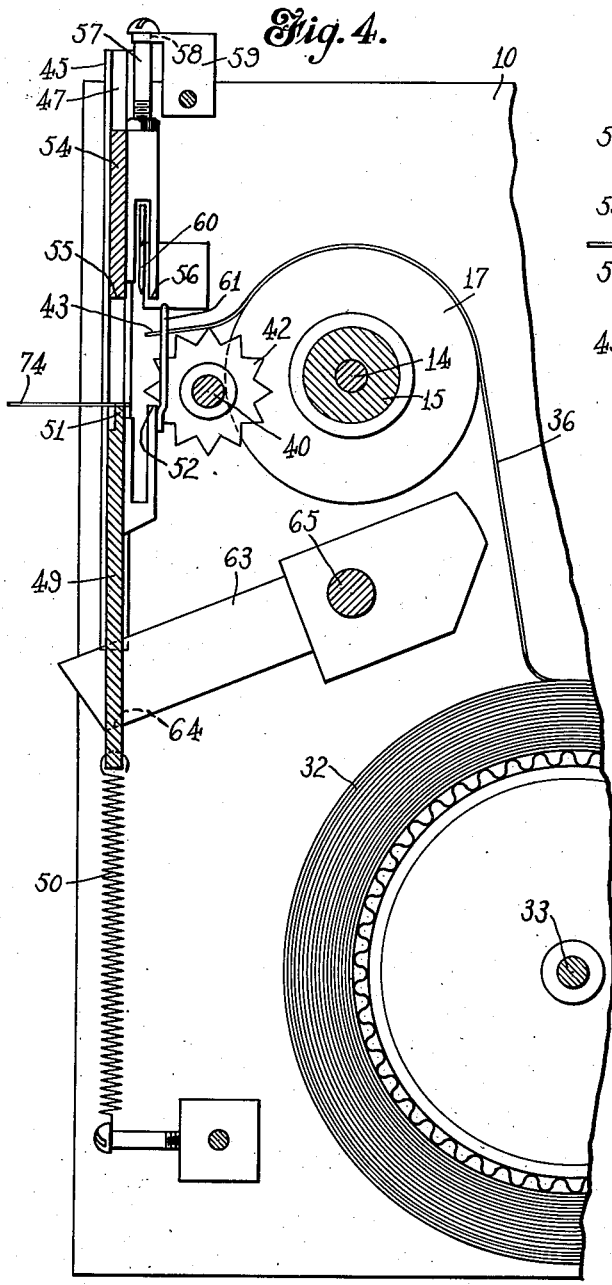
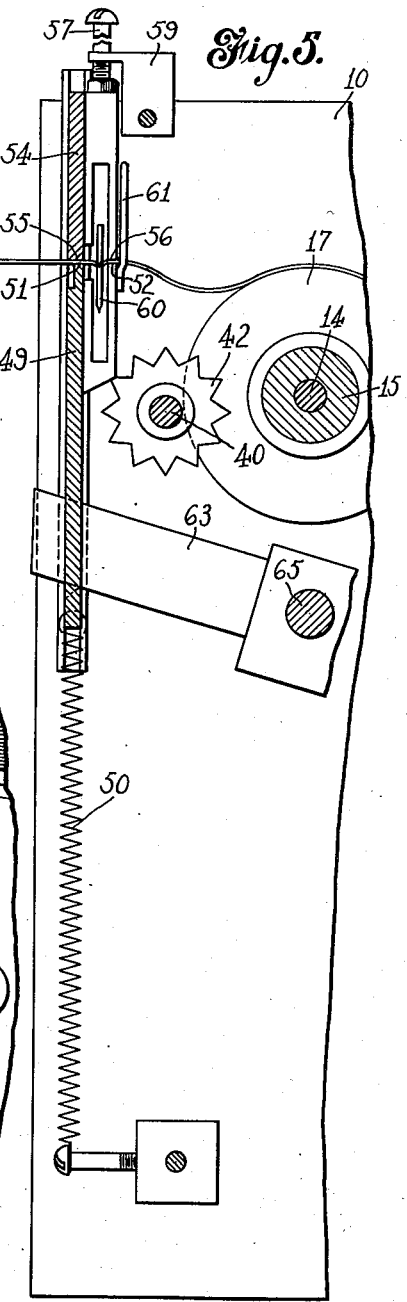
Inventor
Alfred P. Krueger
By Rockwell & Bartholow
Attorneys Nov. 6, 1951 A. P. KRUEGER 2,573,911
TAPE-DISPENSING DEVICE
Filed July 12, 1946 3 Sheets-Sheet 3
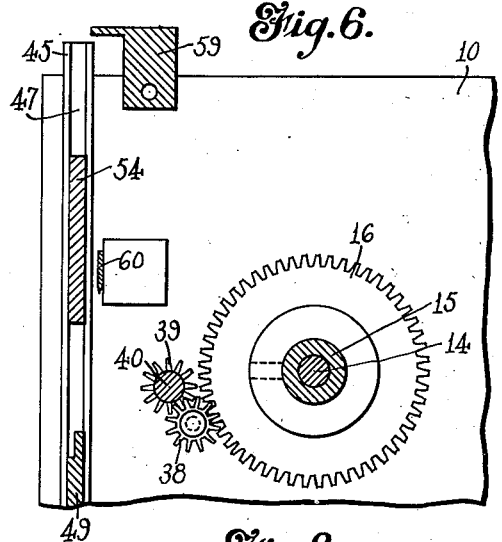
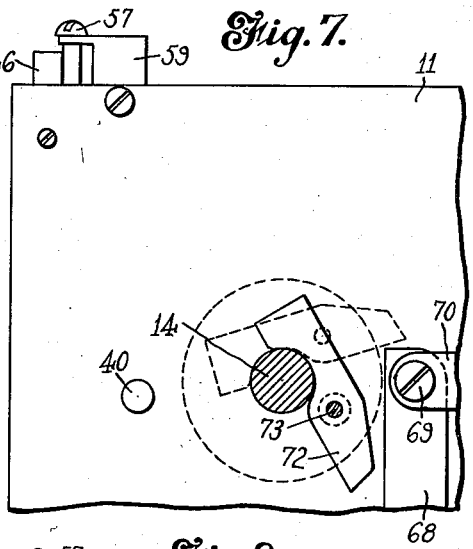
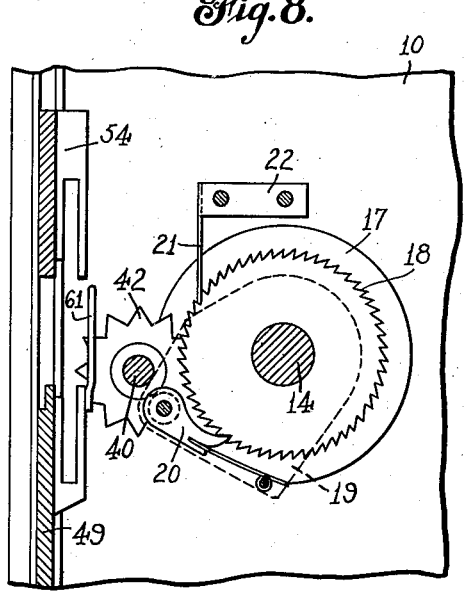
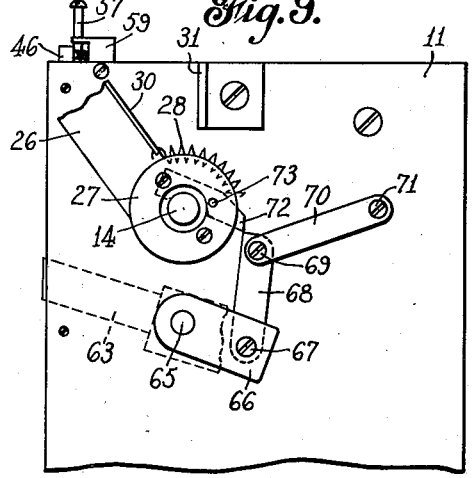
Inventor
Alfred P. Krueger
By Rockwell & Bartholow
Attorneys Patented Nov. 6, 1951

2,573,911

UNITED STATES PATENT OFFICE 2,573,911

TAPE-DISPENSING DEVICE

Alfred P. Krueger, Stratford, Conn., assignor to Derby Sealers, Incorporated, Derby, Conn., a corporation of Connecticut Application July 12, 1946, Serial No. 683,247

22 Claims. (Cl. 164—39)

1

This invention relates to tape-dispensing machines, and more particularly to a machine for dispensing pressure-sensitive tape. Such tape is usually tacky upon one surface, so that it will adhere to the surface of an article upon which it is placed with a certain amount of pressure. On account of its tacky nature, the serving or dispensing of tape of this kind has been attended with certain problems.

Prior machines for dispensing such tape have generally been of two kinds. In one kind of such machines the tape is drawn from the supply roll manually by being engaged with the fingers, or in some instances it is drawn from the supply roll by its adherence to a feeding device, usually a feed roll, and is torn off against a fixed severing means or tear-off blade when the proper amount has been dispensed. In the other type of machines of this character, the tape is drawn from the supply roll by a feed roll or equivalent means to which the tape adheres, and is cut off into short lengths so that the severing operation is performed mechanically and not manually. In devices of the latter type, however, where the severing is performed mechanically, usually the severed piece of tape is supported upon spaced surfaces to which it adheres and must be pulled from these surfaces. Usually, therefore, there is no free length of tape extending from the machine which may be readily grasped and used without considerable inconvenience.

One reason for the difficulty in delivering from a dispensing machine a severed length of tape of this kind is that the tape is of very light weight, and usually must be supported on both sides of the severing means during the severing operation, so that in prior machines the severed end remained in adhering relation to the feeding device and usually remained in a position in which it was inconvenient for the operator to grasp it and detach it from the feeding means.

I contemplate by the present invention a device which will dispense a given length of pressure-sensitive tape by drawing the tape from the supply roll, severing it, and delivering the severed portion in such a position that it may be readily grasped by the operator in a manner in which it may be conveniently applied to a package. Moreover, the length of tape which has been severed will be supported by the machine only at its severed end, the remainder of the severed portion projecting from the machine, where it may be freely grasped.

In the present device, in contrast with prior devices, the tape is stripped from the feed roll

2 or other feeding device, before being severed, whereas in prior devices it was usually held by the feeding device during the severing operation, and means are provided for gripping the stripped portion of the tape at spaced points in its length so that it may be severed between these points. Also the severed portion of the tape remains in adhering relation to one of the gripping members so that it is held only at its rear end, the remainder of the severed strip projecting forwardly from the machine.

One object of the present invention is to provide a novel apparatus for dispensing pressure-sensitive tape.

A further object of the invention is to provide a device for dispensing pressure-sensitive tape, such that a predetermined length of tape will be drawn from a supply roll, severed, and delivered in a position in which it projects from the machine and hence may be readily grasped by the operator.

A still further object of the invention is to provide a device for dispensing pressure-sensitive tape, which device will draw or feed the tape from the supply roll, strip it from the feeding means, and then sever the stripped portion of the tape so that it will be readily available for use.

A still further object of the invention is to provide a device for dispensing Scotch tape such that the tape will be intermittently drawn from a supply roll, by the stroke of an oscillating lever in one direction, by a suitable feeding mechanism, stripped from the feeding mechanism, and the stripped portion severed from the remainder of the supply upon a reverse or return stroke of the lever.

Still another object of the invention is to provide a machine for dispensing Scotch tape as described above, wherein the length of the strip severed from the supply roll of tape may be varied within reasonable limits.

To these and other ends the invention consists in the novel features and combinations of parts to be hereinafter described and claimed.

In the accompanying drawings:

Fig. 1 is a side elevational view of a tape-dispensing device embodying my invention;

Fig. 2 is a front elevational view thereof;

Fig. 3 is a sectional view on line 3—3 of Fig. 1;

Fig. 4 is a sectional view on line 4—4 of Fig. 3;

Fig. 5 is a view similar to Fig. 4 but showing the parts in another position;

Fig. 6 is a sectional view on line 6—6 of Fig. 3;

Fig. 7 is a sectional view on line 7—7 of Fig. 3;

Fig. 8 is a sectional view on line 8—8 of Fig. 3; and

Fig. 9 is a fragmentary side elevational view of the upper part of the device, showing the operating levers in positions other than that shown in Fig. 1.

To illustrate a preferred embodiment of my invention, I have shown a tape-dispensing machine comprising a pair of upstanding side frames 10 and 11, which frames may be held in spaced relation in any convenient manner, such as by screws 12 and spacing members 13.

Rotatably mounted in the frame members is the main shaft 14, and rotatably mounted upon this shaft is a sleeve 15 having keyed or secured thereto a gear 16, a feed roll 17, and a ratchet wheel 18. As stated, the members 16, 17 and 18 are secured to the sleeve so that they will rotate therewith.

Secured to the shaft 14 is a pawl carrier 19 (Figs. 3 and 8), and a pawl 20 is pivoted to this carrier and adapted to engage the teeth of the ratchet 18. As this pawl carrier is secured to the shaft 14, rotation of the latter in a counterclockwise direction, as shown in Figs. 1 and 8, will effect rotation of the pawl carrier and likewise effect rotation of the ratchet wheel. As the latter is secured to the sleeve 15, rotation of the ratchet wheel will rotate the sleeve, and, therefore, rotate the feed roll 17 and the gear 16. It will also be apparent that the shaft 14 will have a one-way connection with the ratchet wheel 18, and that rotation of the shaft and pawl carrier in a clockwise direction, as shown in Figs. 1 and 8, will not actuate the ratchet wheel, the pawl riding idly over the teeth of this wheel during such movement. In order to prevent movement of the ratchet wheel in a reverse or clockwise direction during reverse rotation of the shaft 14, a holding pawl 21 may be secured to the side frame 10 by means of a block 22, the holding pawl engaging the teeth of the ratchet wheel in a manner to prevent clockwise movement thereof.

The shaft 14 projects through the side frame 11, and on its projecting end is secured a collar 24 having a hub 25 to which is secured a lever 26 and a second grooved collar 27. It will be understood that with this construction the lever 26 is rigidly secured to the shaft 14, as is also the grooved collar 27, so that when the lever is drawn to the left, or in a counterclockwise direction, as shown in Fig. 1, the shaft 14 will be rotated. A spring 28 is secured at its lower end to a pin 29 on the side frame 11, and secured at its upper end to a flange 30 on the lever 26, the spring being disposed in the peripheral groove of the collar 27, so that tension upon the spring will tend to rotate the lever 26 in a clockwise direction, as seen in Fig. 1, so as to normally maintain it against an L-shaped stop 31 secured on the side frame 11.

A supply roll 32 of tape is rotatably supported upon a pin or shaft 33 extending between the side plates 10 and 11, the roll being properly positioned between the plates by spacing collars 34 and 35 (Fig. 3). As shown more especially in Fig. 4, the supply roll 32 is mounted adjacent the lower part of the frame, and the free end of the tape 36 extends upwardly therefrom, to be trained about the feed roll 17, previously described, and, as this roll is provided with a knurled or roughened surface, the tape will adhere thereto and be drawn from the supply roll when the feed roll is rotated. As will be understood from the foregoing, movement of the lever 26 in a counterclockwise direction, as shown in Fig. 1, will serve to rotate the feed roll 17, and thus deliver tape from the machine. It is contemplated that the lever 26 be moved forwardly a certain distance and then released, so that it will be returned to its normal position against the stop 31 by the spring 28, the lever, therefore, having an oscillating motion and serving to intermittently feed a length of tape depending upon the angle through which the lever is moved. If desired, stop members (not shown) may be provided to limit the movement of the lever 26 in a counterclockwise direction, and, therefore, limit the length of tape dispensed at a single stroke. It will be understood, however, that, if desired, repeated strokes of the lever may be made so that any desired length of tape may be dispensed prior to the severing operation, which will be hereinafter described.

The gear 16 meshes with a pinion 38 (Fig. 6) mounted on the side frame 10, which in turn meshes with a pinion 39 secured upon a shaft 40 rotatably mounted in the frame members 10 and 11. A pair of toothed stripping wheels 41 and 42 are secured to this shaft, one of these stripping wheels being disposed upon each side of the feed roll 17 and being closely adjacent the lateral surfaces of this roll. As will be seen from Figs. 4 and 5, these stripping members overlap the forward edge of the feed roll 17, and, as these members rotate in the same direction as, and preferably at a greater peripheral speed than, the feed roll, they serve to strike the under or tacky surface of the tape and strip it from the feed roll, so that it emerges or is directed forwardly of the stripping devices in a freely projecting position, as shown at 43 (Fig. 4).

The severing means for this free end of the tape will now be described. Mounted upon the frame members 10 and 11 are vertically extending rails 45 and 46 having oppositely facing guideways 47 and 48 therein. Slidably mounted in these guideways is a lower gate 49 urged downwardly by a spring 50. Adjacent its upper end this gate is provided with spaced gripping members 51 and 52, which normally lie slightly below the path of the tape as it comes from the stripping members 41 and 42. The rear gripping member 52 is slotted, as shown at 53 (Fig. 3), to permit the teeth of the stripping wheels to project therethrough.

Also slidably mounted in the guideways 47 and 48 is an upper block 54 having at its lower edge a pair of spaced gripping surfaces 55 and 56, which surfaces are adapted to cooperate with the gripping surfaces 51 and 52 to grip the tape upon each side of a severing member, as will be hereinafter explained.

The block 54 is freely mounted in the guideways 47 and 48, but normally stands in a downward position, shown in Fig. 4, due to its weight, its position being limited by a screw 57 secured thereto, which screw extends through an opening 58 in a guide member 59 secured to the frame.

Within the space between the upper gripping members 55 and 56, a severing knife 60 is secured to the frame in fixed relation. As shown in Fig. 2, this knife may be inclined to the horizontal, so that it will engage the tape first at one edge, and gradually cut therethrough. To the lower gripping member 52 is secured a guiding member 61 in the form of an open wire member of stirrup shape having a downwardly bowed upper portion 62 (Fig. 2) to engage the intermediate portion of the upper surface of the tape between its edges and prevent the free end of the tape from curling upwardly toward the upper gripping member 56 after the severing operation, so that it cannot adhere to this member and interfere with a subsequent feeding operation.

A lever 63 extends through an opening 64 in the gate 49, this lever being secured to a shaft 65 rotatably mounted in the frame. A crank arm 66 (Fig. 1) is secured to this shaft, and to this crank arm is pivoted at 67 a link 68, the latter being pivoted at 69 to one end of a link 70, the other end of which is pivoted at 71 to the frame member 11.

A detent 72 (Figs. 3 and 7) is pivoted at 73 to the rear face of the collar 24, this detent being adapted to stand normally in the full-line position shown in Fig. 7, when the lever 26 is in the position of rest shown in Fig. 1, but is moved to the dotted-line position, shown in Fig. 7, when the lever 26 is moved a sufficient distance in a counterclockwise direction. When the detent 72 has been moved beyond the upper end of the link 68, it will drop by gravity into a position to engage the latter, as shown in dotted lines in Fig. 7, and will, upon a reverse movement of the shaft 14, carry the link 68 downwardly, as shown in Fig. 9, until it rides off the upper corner of this link.

Movement of the link 68 downwardly rocks the shafts 65, which moves the arm or lever 63 upwardly, thus raising the gate 49. Upon the raising of the gate, the gripping members 51 and 52 engage the lower surface of the tape and carry the same upwardly against the cooperating gripping surfaces 55 and 56, and thence, upon continued movement, past the knife or severing member 60, so that the tape will be severed between these gripping members, as shown in Fig. 5. During the latter part of this movement the block 54 will also be moved upwardly, so that its weight will bear on the upper surface of the tape, thus gripping the latter firmly between the surfaces 51 and 55 in front of the knife 60 and the members 52 and 56 rearwardly of the knife 60, so that the tape will be held firmly on each side of the knife.

When the detent member 72 rides off the upper edge of the link 68, as it is about to do in the position shown in Fig. 9, the spring 50 will pull the gate 49 downwardly, and restore the lever 63 and associated parts to their normal positions. As the gate 49 moves downwardly, it will carry with it the severed portion of the tape 74 (Fig. 4), the extreme rear end of this portion adhering to the gripping surface 51 and being supported thereby, so that the remainder extends forwardly from the frame of the machine and may be readily grasped by the operator.

It is believed that the operation of the device will be clear from the foregoing description, but it may be briefly described as follows: The lever 26 is grasped by the operator and moved in a counterclockwise direction to feed a sufficient quantity of tape from the supply roll by means of the adherence of the tacky side of the tape to the surface of the feed roll. The lever will then be released, to be returned to a position against the stop 31 by the spring 28, the feed roll being held against reverse movement during the return of the lever by the holding pawl 21.

As the tape is fed forwardly by the feed roll, it is stripped from this roll by the stripping wheels 41 and 42, so that it projects outwardly through the guiding stirrup 61 and between the upper and lower gripping members. Presumably the lever 26 will be moved sufficiently far so that the detent 72 will ride over the upper edge of the link 68 so as to reach the dotted-line position shown in Fig. 7. Upon the return of the lever by the spring 28, the shaft 65 will be rocked, thus bringing the gate 49 upwardly so as to grip the tape between the cooperating gripping members 51, 55 and 52, 56, and then carry the tape upwardly past the knife 60, where it will be severed. About this time the end of the detent 72 rides off the upper corner of the link 68, as shown in Fig. 9, and the spring 50 brings the gate 49 and associated parts back to their position of rest, the gripping surface 51 carrying the severed end of the tape with it, as shown in Fig. 4. The block 54 will follow the gate 49 downwardly by its own weight as far as permitted by the limiting screw 57.

During the downward movement of the gate 49, the tape will adhere to the gripping surfaces 51 and 52 and be carried downwardly thereby. The unsevered end of the tape will be stripped from the gripping surface 52 by the stripping wheels 41 and 42, and will then be engaged by the guide stirrup 61, and prevented from adhering to upper gripping surface 56. This stirrup preferably contacts only the intermediate portion of the tape so as not to engage the edges, which may be tacky to some extent. It will be noted that the gripping surface 51 is of lesser width than the body of the gate 49, so that the tape will adhere thereto over a small area only, and thus may be readily removed therefrom.

While I have shown and described a preferred embodiment of my invention, it will be understood that it is not to be limited to all of the details shown, but is capable of modification and variation within the spirit of the invention and within the scope of the claims.

What I claim is:

1. A machine for dispensing pressure-sensitive tape, comprising tape-feeding means including a tape-advancing member to which the tape adheres, movable stripping means to strip the free end of the tape from said member, severing means, and means to effect relative movement between the severing means and the stripped portion of the tape to sever the latter.

2. A machine for dispensing pressure-sensitive tape, comprising tape-feeding means including a tape-advancing member to which the tape adheres, means to strip the free end of the tape from said member, severing means, means to effect relative movement between the severing means and the stripped portion of the tape to sever the latter, and gripping means to hold the stripped portion of the tape during the severing operation.

3. A machine for dispensing pressure-sensitive tape comprising tape-feeding means including a tape-advancing member to which the tape adheres, means to strip the free end of the tape from said member, severing means, and means to grip the tape at a point spaced from the end thereof and to effect relative movement of the tape and severing means, to sever the tape.

4. A machine for dispensing pressure-sensitive tape, comprising tape-feeding means including a tape-advancing member to which the tape adheres, means to strip the free end of the tape from said member, severing means, means to effect relative movement between the severing means and the stripped portion of the tape to sever the latter, and means to grip and hold the tape on both sides of the severing means during the severing operation.

5. A machine for dispensing pressure-sensitive tape, comprising tape-feeding means including a tape-advancing member to which the tape adheres, means to strip the free end of the tape from said member, means for severing the tape adjacent the rear end of said stripped portion, and means for holding said severed portion adjacent the rear end thereof with its forward end in a freely projecting position to be grasped by the operator.

6. A machine for dispensing pressure-sensitive tape, comprising tape-feeding means including a tape-advancing member to which the tape adheres, said member using only the adhesiveness of the tape for driving engagement of the tape therewith, means to strip the free end of the tape from said member, and movably mounted means for effecting the severing of a stripped portion of the tape.

7. A machine for dispensing pressure-sensitive tape, comprising tape-feeding means including a tape-advancing member to which the tape adheres, means to strip the free end of the tape from said member, severing means comprising a fixed blade, and means to move a portion of the tape against said blade to sever the tape.

8. A machine for dispensing pressure-sensitive tape, comprising tape-feeding means including a tape-advancing member to which the tape adheres, severing means, and means to strip the tape from said advancing member and move it against said severing means to sever a length thereof.

9. A machine for dispensing pressure-sensitive tape, comprising tape-feeding means including a tape-advancing member to which the tape adheres, movable stripping means to strip the free end of the tape from said member, movably mounted means for effecting the severing of a stripped portion of the tape, and a manually actuatable member for operating said feeding means, stripping means and severing means.

10. A machine for dispensing pressure-sensitive tape, comprising tape-feeding means including a tape-advancing member to which the tape adheres, means to strip the free end of the tape from said member, movably mounted means for effecting the severing of a stripped portion of the tape, and a manually actuatable member for operating said feeding means, stripping means and severing means, said member being oscillatable in forward and reverse directions, said feeding means being operated by movement of the lever in one direction and said severing means by movement of the lever in the reverse direction.

11. A machine for dispensing pressure-sensitive tape, comprising tape-feeding means including a tape-advancing member to which the tape adheres, means to strip the free end of the tape from said member, severing means comprising a fixed blade, and means to move a portion of the tape against said blade to sever the tape, said last-named means comprising gripping members engaging opposite sides of the tape.

12. A machine for dispensing pressure-sensitive tape, comprising tape-feeding means including a tape-advancing member to which the tape adheres, means to strip the free end of the tape from said member, severing means comprising a fixed blade, and means to move a portion of the tape against said blade to sever the tape, said last-named means comprising gripping members engaging opposite sides of the tape on both sides of the blade.

13. A machine for dispensing pressure-sensitive tape, comprising tape-feeding means including a tape-advancing member to which the tape adheres, means to strip the free end of the tape from said member, severing means comprising a fixed blade, means to move a portion of the tape against said blade to sever the tape, said last-named means comprising gripping members engaging opposite sides of the tape, and a gripping member on the tacky side of the tape supporting the severed portion of the tape after the severing operation, with a free end of the tape projecting therefrom.

14. A machine for dispensing pressure-sensitive tape, comprising tape-feeding means including a tape-advancing member to which the tape adheres, means to strip the free end of the tape from said member, spaced movable members between which the stripped end of the tape projects, means to effect relative movement of said members to grip the tape therebetween, and means to sever the tape while so gripped.

15. A machine for dispensing pressure-sensitive tape, comprising tape-feeding means including a tape-advancing member to which the tape adheres, means to strip the free end of the tape from said member, severing means, movable members between which the stripped end of the tape emerges, means to effect relative movement of said members to cause them to grip the tape therebetween, and then to move both members to sever the tape while so gripped.

16. A machine for dispensing pressure-sensitive tape, comprising tape-feeding means including a tape-advancing member to which the tape adheres, means to strip the free end of the tape from said member, severing means, movable members between which the stripped end of the tape emerges, means to effect relative movement of said members to cause them to grip the tape therebetween, and then to move both members to sever the tape while so gripped, each of said members having gripping surfaces on both sides of the severing member.

17. A machine for dispensing pressure-sensitive tape, comprising tape-feeding means including a tape-advancing member to which the tape adheres, means to strip the free end of the tape from said member, severing means, movable members between which the stripped end of the tape emerges, means to effect relative movement of said members to cause them to grip the tape therebetween, and then to move both members to sever the tape while so gripped, and one of said members carrying guiding means to guide the unsevered end of the tape between the gripping members.

18. A machine for dispensing pressure-sensitive tape, comprising tape-feeding means including a tape-advancing member to which the tape adheres, means to strip the free end of the tape from said member, severing means, means to effect relative movement between the severing means and the stripped portion of the tape to sever the latter, and means to move the unsevered end of the tape away from the severing means after the severing operation.

19. A machine for dispensing pressure-sensitive tape, comprising tape-feeding means including a tape-advancing member to which the tape adheres, movable stripping means to strip the free end of the tape from said member, severing means, means to effect relative movement between the severing means and the stripped portion of the tape to sever the latter, and guide means contacting the non-tacky side of the tape intermediate the edges thereof to guide the end of the tape stripped from the feeding means.

20. A machine for dispensing pressure-sensitive tape comprising tape-feeding means, actuating means for the feeding means, a severing member, a pair of opposed gripping members to engage opposite surfaces of the tape on one side of the severing member, a second pair of opposed gripping members to engage opposite surfaces of the tape on the opposite side of said severing member, means holding said gripping members out of engagement with the tape during the operation of the feeding means, and means operated by said actuating means to effect relative approaching movements of said opposed members to grip the tape therebetween and to effect relative movement between the tape and the severing means to sever the tape between said pairs of gripping members.

21. A machine for dispensing pressure-sensitive tape comprising tape-feeding means, a severing member to sever a piece from the free end of the tape, gripping means to engage both surfaces of the tape adjacent the severing member during a severing operation, means to hold said gripping members out of engagement with the tape during a feeding operation, and means to effect gripping of the tape by said members and to effect relative movement between the tape and severing member.

22. A machine for dispensing pressure-sensitive tape comprising tape-feeding means, severing means, opposed gripping members engaging opposite surfaces of the tape at spaced points along its length to hold it between said members, means normally holding said gripping members out of engagement with the tape, an oscillatable member having forward and return strokes connected to said feeding means to actuate the latter upon the forward movement of said oscillatable member, and said oscillatable member being operatively connected to said gripping members to move them into gripping relation with the tape upon a return movement thereof.

ALFRED P. KRUEGER.

REFERENCES CITED

The following references are of record in the file of this patent:

UNITED STATES PATENTS

| Number | Name | Date |
|---|---|---|
| 1,652,715 | Hanscom | Dec. 13, 1927 |
| 2,097,031 | Loewenberg | Oct. 26, 1937 |
| 2,133,868 | Morton | Oct. 18, 1938 |
| 2,137,724 | Lester et al. | Nov. 22, 1938 |
| 2,326,917 | Anderson | Aug. 17, 1943 |